United States Patent [19]

D'Antoni, Sr.

[11] 3,950,837
[45] Apr. 20, 1976

[54] APPARATUS FOR PULLING A FORCE-FITTED POLE PIECE

[76] Inventor: Augustus J. D'Antoni, Sr., 6646 Hooper Road, Baton Rouge, La. 70811

[22] Filed: Nov. 6, 1974

[21] Appl. No.: 521,173

[52] U.S. Cl. ............................. 29/205 R; 29/252
[51] Int. Cl.$^2$ ...................................... H02K 15/00
[58] Field of Search ................. 29/205 R, 252, 260, 29/266

[56] References Cited
UNITED STATES PATENTS

| | | | |
|---|---|---|---|
| 1,273,163 | 7/1918 | Ellis | 29/252 |
| 2,484,400 | 10/1949 | Brown | 29/252 |
| 3,093,894 | 6/1963 | Jurecka | 29/205 R |

Primary Examiner—James L. Jones, Jr.
Assistant Examiner—Harold P. Smith, Jr.
Attorney, Agent, or Firm—Edgar E. Spielman, Jr.

[57] ABSTRACT

An apparatus is disclosed for pulling a tight fitting pole piece from its housing. The apparatus comprises: a plate having at least two apertures therethrough, which plate abuts the housing when the apparatus is in operation; a contact member for contacting the pole piece; two elongated force transmittance members which fit through the two plate apertures and which are joined at one of their ends by the contact member; a connecting member which connects the other end of the two force transmittance members; and a force applying mechanism such as a pneumatic or hydraulic cylinder which is positioned between the plate and the connecting member and which upon application of force against the connecting member causes the contacting member to draw the pole piece contacted by the contacting member toward the plate and out of the housing.

Optional plates which cooperate with the first plate are also disclosed. These optional plates give the first plate versatility whereby the first plate may be utilized for pulling different pole pieces which require different force applying mechanisms and different positions for the force transmittance members.

9 Claims, 21 Drawing Figures

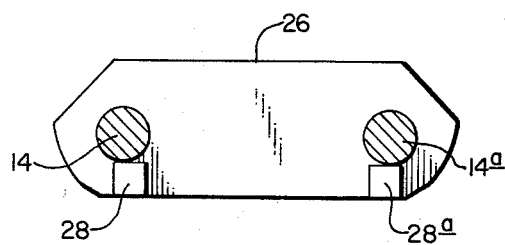
FIG. 7.
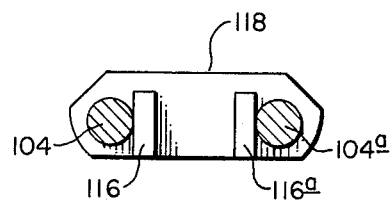
FIG. 8.
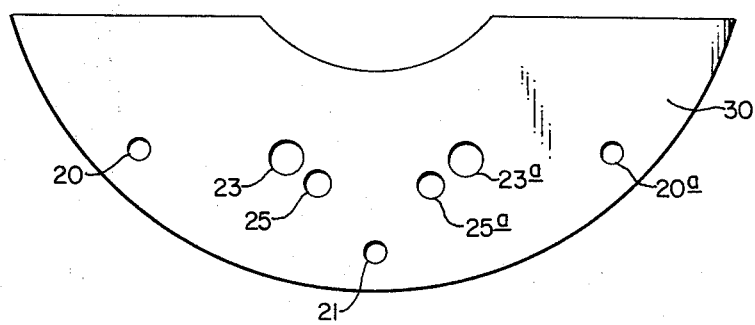
FIG. 9.
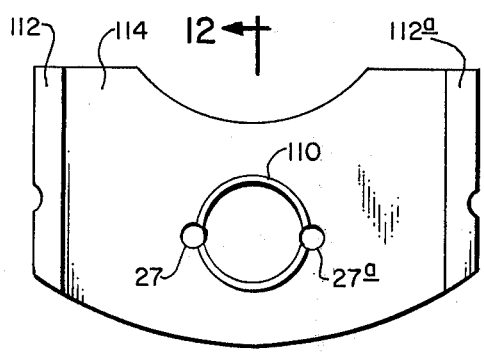
FIG. 10.
FIG. 12.   FIG. 11.
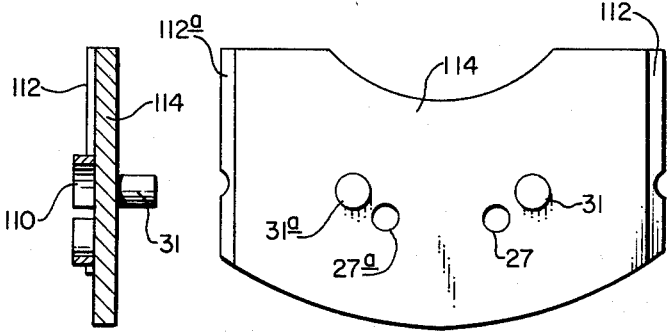
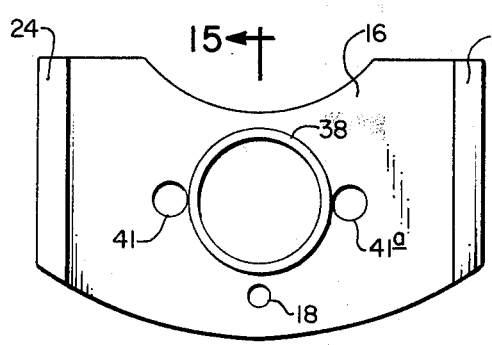
FIG. 13.
FIG. 15.   FIG. 14.
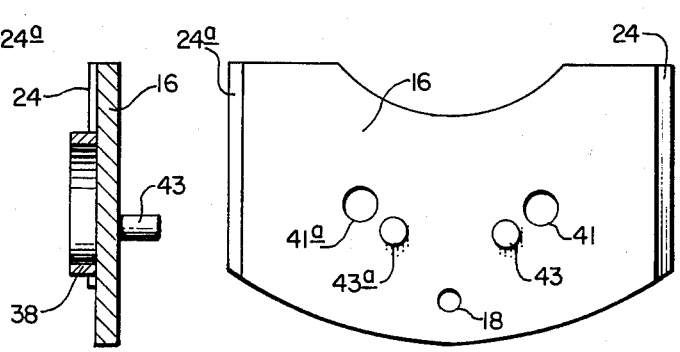

APPARATUS FOR PULLING A FORCE-FITTED POLE PIECE

BACKGROUND OF THE INVENTION

Electrical welding generators generally comprise an electrical motor and cooperating motor stator to drive a generator for the generation of a high welding current. The current developed from turning of the generator is usually passed on to a commentator which in turn communicates the current to the welding apparatus through brushes. Some of the present day commercial welding generators mount the motor rotor, generator rotor and commentator on the same shaft. The motor stator surrounds the motor rotor while a generator housing holds pole pieces which are mounted around the generator rotor. The axle is supported on each end by bearings and may even carry cooling fans at one or both ends. A housing is then placed around the entire working apparatus to keep the apparatus free from dust and the like.

The pole pieces which are force-fitted into the generator rotor housing are surrounded by electrical windings. The purpose of having a forced fit is to insure that a low reluctance path will be realized by the magnetism induced by the electrical windings. Oftentimes the pole pieces will be destroyed due to equipment breakdown. When this occurs their removal is necessary and is generally achieved by a pull-down of nearly the entire apparatus which usually includes pulling of the axle containing the motor rotor, generator rotor and commentator. This near complete pull-down is time-consuming and thus expensive.

Therefore it is an object of this invention to provide an apparatus which allows for the pulling of force-fitted pole pieces from generator housings which does not require a near complete pull-down of the electrical welding apparatus.

This invention relates to an apparatus for pulling a tight-fitting pole piece from a housing which apparatus comprises: a first plate having at least two first plate apertures therethrough; contact means for contacting the pole piece; at least two substantially parallel elongated force transmittance means attached at one of their ends to the contact means and passing through said apertures; connecting the force transmittance means at their other ends; and force means contacting the plate on that side of the plate opposite the contact means and contacting the connecting means whereby an outward force applied by the force means causes the connecting means to move away from the plate and the contact means to move towards the plate.

The apparatus of this invention may also include optional additional plates which overlie the first plate. These additional plates are utilized to receive different sized force means, adjust the spacing distance between the force transmittance means and to lend extra strength to the first plate. Different sized force means and adjustment of the spacing distance is of importance when the apparatus of this invention is used on various sized pole pieces which various pieces require more or less pulling force for their removal and different spacing for a proper fit.

These and other features of the invention contributing satisfaction in use and economy in manufacture will be more fully understood from the following description of a preferred embodiment of this invention when taken in connection with the accompanying drawings, wherein identical numerals refer to identical parts and in which;

FIG. 7 is a sectional view taken along sectional lines 7—7 of FIG. 1;

FIG. 8 is a sectional view taken along sectional lines 8—8 of FIG. 4;

FIG. 9 is a side elevational view of the plate utilized in the embodiments shown in FIGS. 1 and 4;

FIG. 10 is a front elevational view of the optional plate utilized in FIG. 4;

FIG. 11 is a back elevational view of the plate shown in FIG. 10;

FIG. 12 is a sectional view taken along sectional lines 12—12 of FIG. 10;

FIG. 13 is a front elevational view of the optional plate shown in FIG. 1;

FIG. 14 is a back elevational view of the optional plate shown in FIG. 13;

FIG. 15 is a sectional view taken along section lines 15—15 of FIG. 13;

Figure 1:
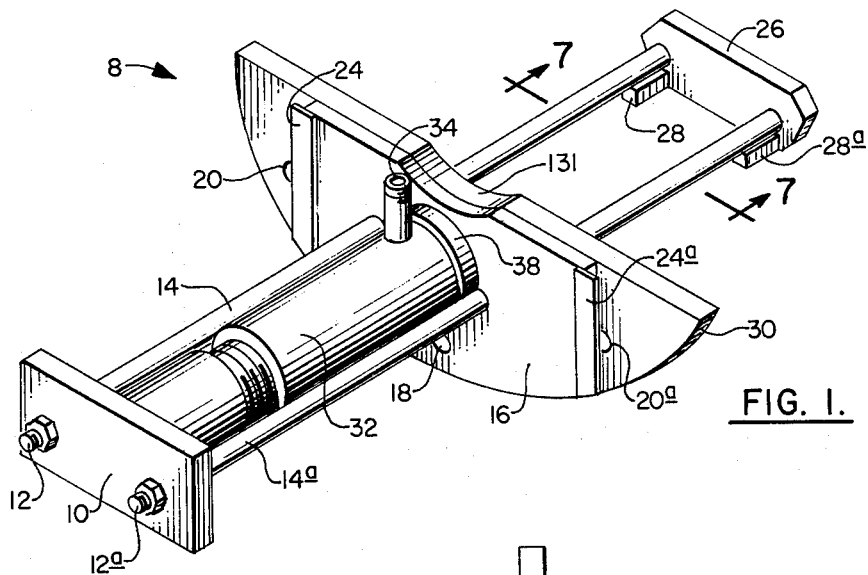
FIG. 1 is a perspective view of a first embodiment of this invention.
Figure 2:
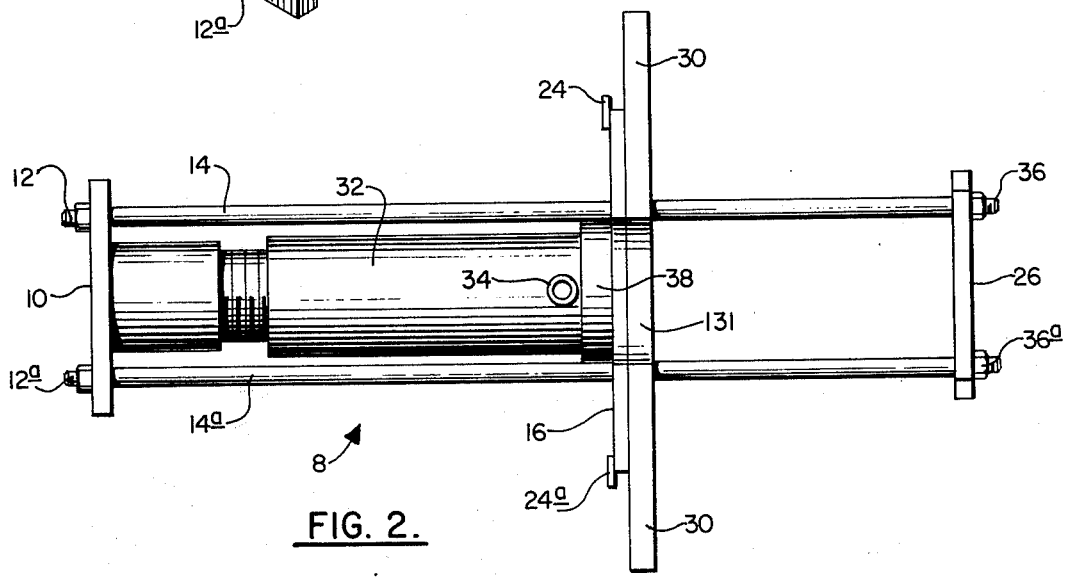
FIG. 2 is a top planar view of the embodiment of FIG. 1.
Figure 3:
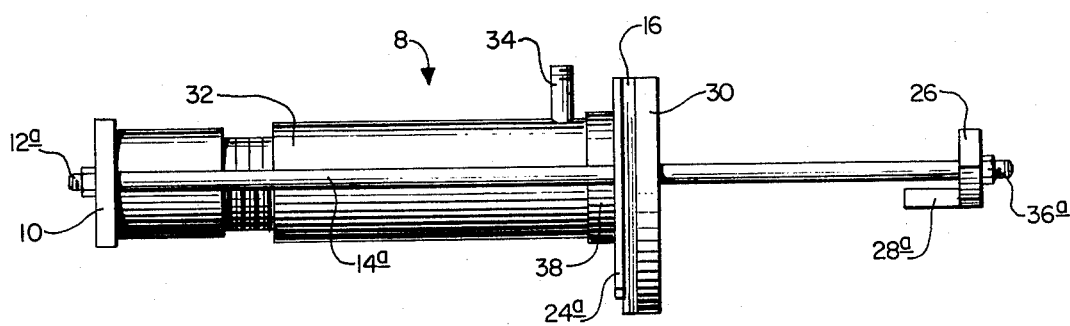
FIG. 3 is a side elevational view of the embodiment of FIG. 1.

Referring now to the embodiment of this invention illustrated in FIGS. 1–3, 7, 9 and 13–15, it can be seen that the apparatus illustrated, generally designated by the numeral 8, has a semicircular plate 30. Semicircular plate 30 has a semicircular indentation 131 on its straight edge. Semicircular indentation 131 is to accommodate the commentator portion of the electric welding generator, hereinafter described. Overlying one face of plate 30 is first holding plate 16 which aids in holding pneumatic or hydraulic cylinder 32 by means of first holding plate collar 38. Pressurized fluid is fed to pneumatic or hydraulic cylinder 32 by means of feed line 34 which is attached to an apparatus (not shown) for feeding pressurized fluid to pneumatic or hydraulic cylinder 32. Fitting through the previously mentioned apertures, hereinafter described, in first holding plate 16 and plate 30 are first rods 14 and 14a. Connecting rods 14 and 14a at one end is first connecting plate 10 which is held in place by first rod nuts 12 and 12a. As can be seen from the drawing, pneumatic or hydraulic cylinder 32 also abuts connecting plate 10.

Connecting rods 14 and 14a on the opposite sides of plate 30 is first contacting plate 26 which is held in place with first contacting plate nuts 36 and 36a. From the drawing it is seen that first contacting plate 26 is hexagonal. The preferred hexagonal shape of first contacting plate 26 is to facilitate the unencumbered passage of this plate through the generator housing as the pole piece is pulled. Other shapes may be required by electrical welding generators different from that shown depending upon the passage space between the other pole pieces and their coils and between the generator housing and the various rotors and commentators.

Protruding from contacting plate 26 are guide ears 28 and 28a. These ears will fit on either side of the pole piece to be pulled and aid in guiding the pole piece out of the generator housing and keeping the pole piece from twisting and insuring a straight pull. Guide ears 28 and 28a are located beneath rods 14 and 14a respectively, however other positions may be used as the particular configuration of the pole piece to be pulled requires.

As mentioned previously, first holding plate 16 and plate 30 have apertures which are in alignment and through which rods 14 and 14a pass. As can be seen in FIG. 9, plate 30 has apertures 23 and 23a which bound a second pair of apertures 25 and 25a. The distance from the center of the semicircle formed by plate 30 to the center of apertures 23 and 23a is equidistant for each aperture as is the distance for the second pair of apertures 25 and 25a. It should be noted that the distance for the second pair of apertures 25 and 25a is greater than the distance for the first pair of apertures 23 and 23a. Apertures 23 and 23a are the apertures through which rods 14 and 14a pass for the embodiment shown in FIGS. 1–3. Spaced apart apertures 20, 21 and 20a in plate 30 are utilized singularly or in combination to rigidly connect plate 30 to the generator housing which is hereinafter described.

Figure 17:
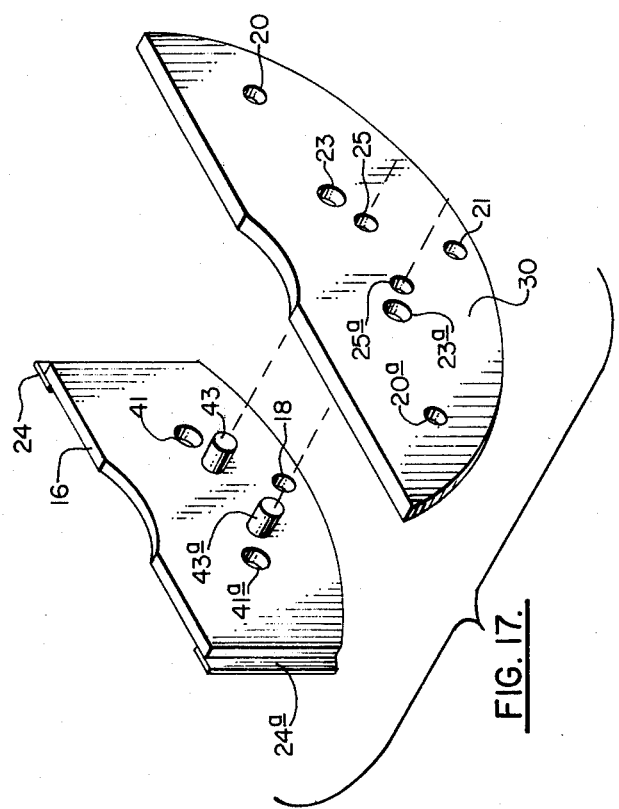
FIG. 17 is a perspective view showing the plate of FIG. 9 and the optional plate of FIG. 13.

Referring now to FIGS. 13–15, it can be seen that first holding plate 16 has three apertures. The first pair of apertures 41 and 41a are the apertures through which rods 14 and 14a pass, respectively. On the side of plate 16 opposite holding plate collar 38 are pegs 43 and 43a. Pegs 43 and 43a fit into the second pair of apertures 25 and 25a in plate 30. This fitting cooperation is shown in FIG. 17. As can also be seen in FIG. 17, first holding plate apertures 41 and 41a align themselves with first pair of apertures 23 and 23a respectively, in plate 30 when first holding plate 16 is in position. Another aperture, first holding connecting aperture 18, is in first holding plate 16. This aperture will overlie aperture 21 in plate 30.

Referring now to a second embodiment of this invention generally designated by the numeral 6, are FIGS. 4–6, FIG. 8, FIG. 9 and FIGS. 10–12. As can be seen from the drawings, the second embodiment illustrated differs from the first embodiment in that the force means is of reduced size, the force transmittance means are positioned closer together, and the pole contacting means is of a different configuration. Such an apparatus would be utilized on a different pole piece than would the embodiment shown in FIG. 1. In fact, the embodiment shown in FIG. 4 would be highly suitable for use on a pole piece having a smaller width than would be the embodiment shown in FIG. 1.

Figure 4:
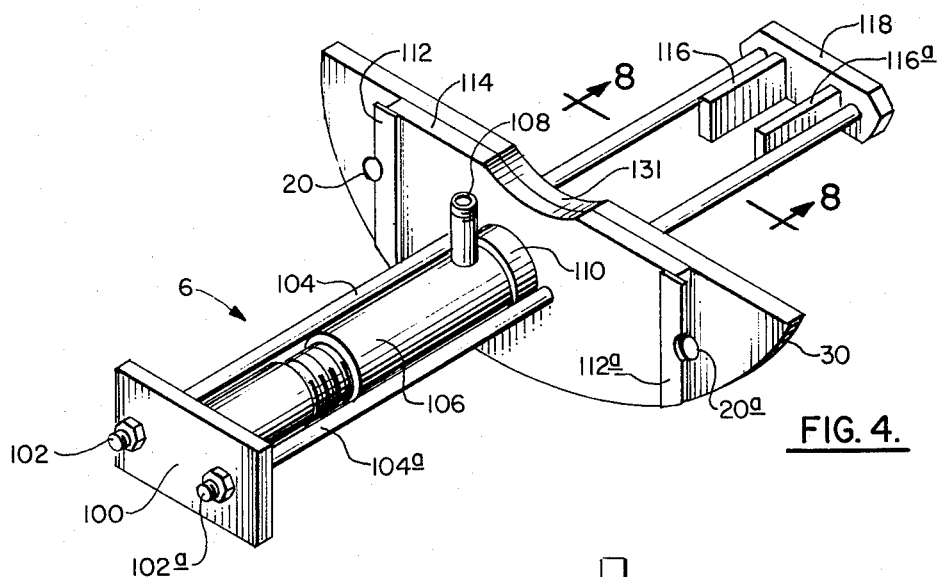
FIG. 4 is a perspective view of another embodiment of this invention.
Figure 5:
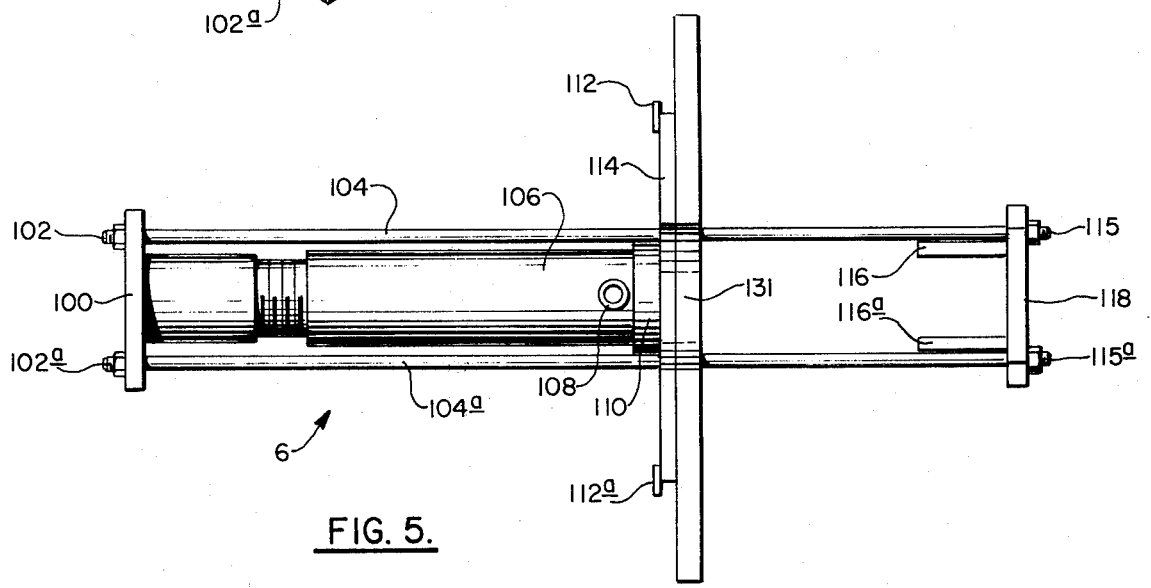
FIG. 5 is a top planar view of the embodiment shown in FIG. 4.
Figure 6:
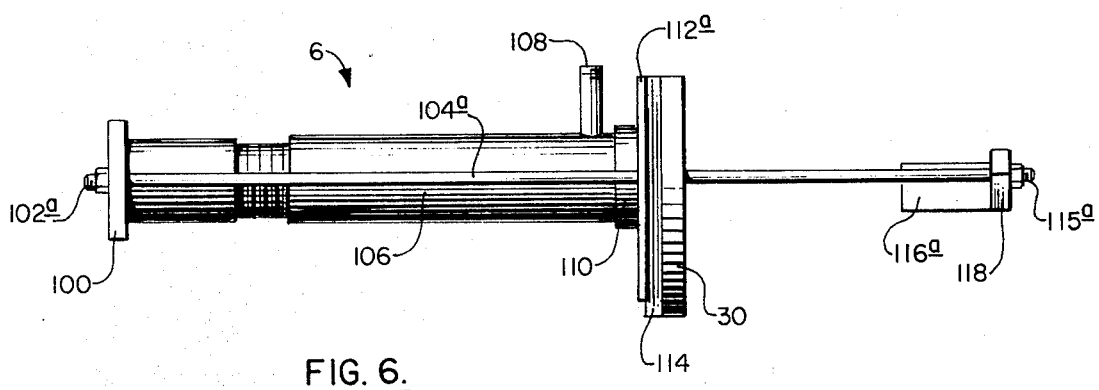
FIG. 6 is a side elevational view of the embodiment shown in FIG. 4.

The apparatus shown in FIGS. 4 et seq. has a first plate 30 which is identical to the previously described plate 30 for the embodiment shown in FIG. 1. As is the case in the first embodiment, an optical second holding plate 114 is provided. Second holding plate 114 overlies plate 30 so that apertures in second holding plate 114 and apertures in plate 30 are in alignment whereby second rods 104 and 104a may pass therethrough. Mounted on the outside surface of second holding plate 114 is second holding plate collar 110 which is dimensioned so as to receive second pneumatic or hydraulic cylinder 106. Pressurized air or liquid is passed to pneumatic or hydraulic cylinder 106 by means of second feed line 108 which in turn is attached to an apparatus (not shown) for feeding pressurized fluid to pneumatic or hydraulic second cylinder 106.

Connecting second rods 104 and 104a is second connecting plate 100. Second rod nuts 102 and 102a are utilized to hold second connecting plate 100 in rigid engagement with second rods 104 and 104a. Connecting rods 104 and 104a on the opposite side of plate 30 is achieved by contacting plate 118 which is attached to the rods by means of second contacting plate nuts 115 and 115a respectively.

As can be seen in the drawings, second contacting plate 118 has projecting from one side thereof ears 116 and 116a. These ears serve to hold the pole piece in alignment and therefore aid in its guidance as it is pulled from the housing. Second guide ears 116 and 116a keep the pole piece from twisting and thus guard against binding of the pole piece in the housing. It should be noted that second contacting plate 118 is of a general hexagonal configuration. This configuration is utilized for the electrical welding generator shown in FIGS. 18–21. However, modification of the configuration of second contacting plate 118 is certainly within the skill of one skilled in the art should the apparatus of this invention be utilized in an electrical welding generator which has different dimensions and clearances than that shown in the previously mentioned drawings.

As previously described, plate 30 has two pairs of apertures in addition to three holding apertures. The previous description of plate 30 is equally applicable in this description of the second embodiment.

Figure 16:
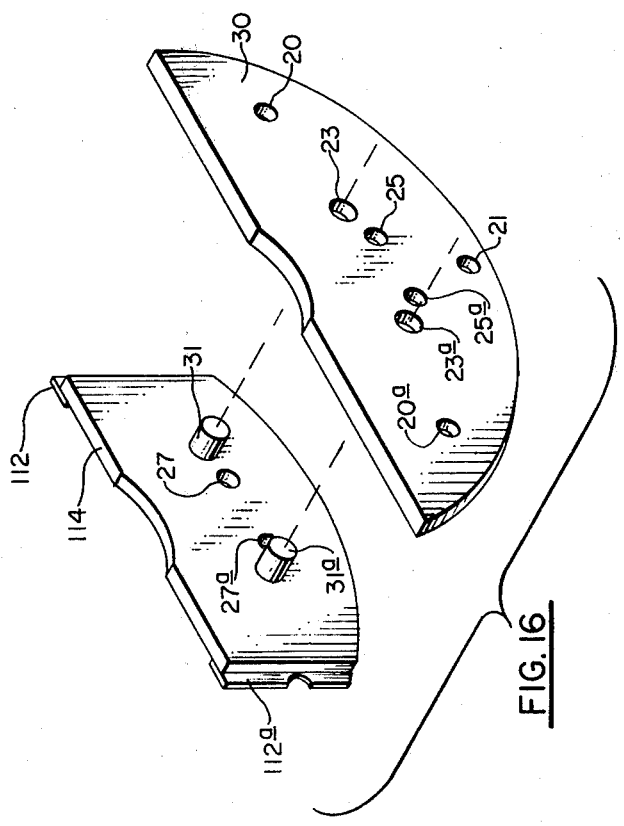
FIG. 16 is a perspective view showing the plate of FIG. 9 and the optional plate of FIG. 10.

FIGS. 10–12 and FIG. 16 show second holding plate 114. Second holding plate 114 has a single pair of second holding plate apertures 27 and 27a. These apertures intersect second holding collar 110. When second holding plate 114 is in position with respect to plate 30, second holding plate apertures 27 and 27a are in alignment with second pair of apertures 25 and 25a respectively of plate 30. This alignment allows for second rods 104 and 104a to pass through both plates. On the opposite side of second holding plate 114 are second pegs 31 and 31a. These pegs fit into the first pair of apertures 23 and 23a in plate 30. This fitting cooperation is shown in FIG. 16. It can also be seen in FIG. 16 that second holding plate apertures 27 and 27a align themselves with second pair of apertures 25 and 25a respectively in plate 30 when second holding plate 114 is in position.

As can be seen in FIGS. 10–15, first holding plate 16 and second holding plate 114 both have handles, 24 and 24a for first holding plate 16, and 112 and 112a for second holding plate 114. These handles are utilized to help in maneuvering these optional plates in position with respect to plate 30. It should be noted that handles 112 and 112a for second holding plate 114 have indentations cut in the outer edges thereof. These indentations align themselves with apertures 20 and 20a in plate 30 so that a bolt may be placed through apertures 20 and 20a without interference from second plate 114 to hold plate 30 in rigid position with relation to the generator housing.

Figure 18:
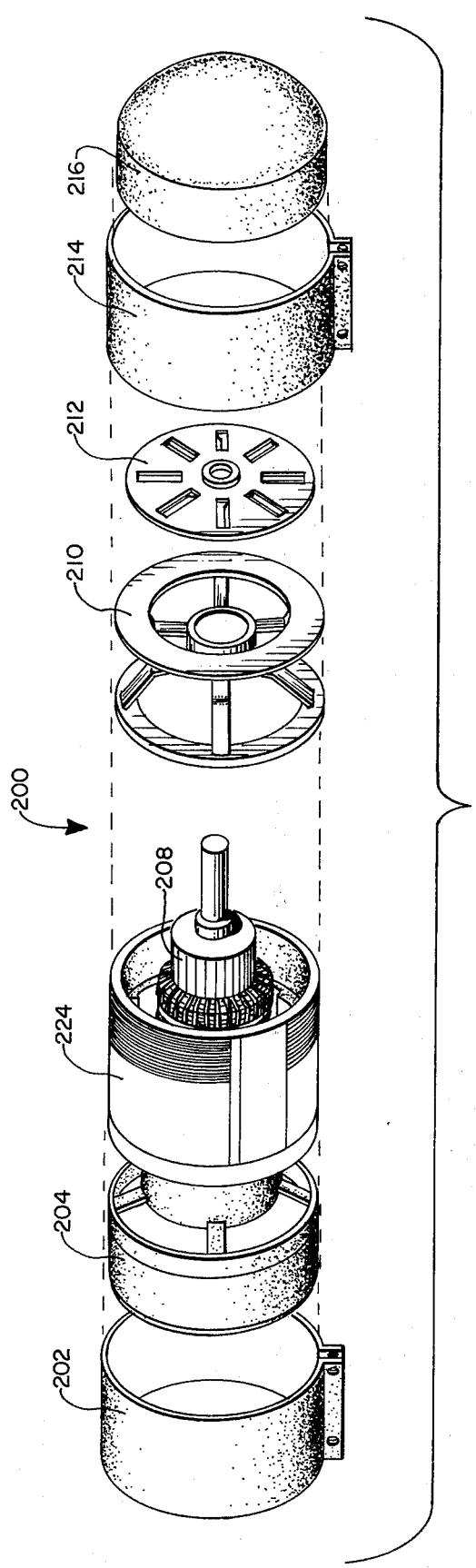
FIG. 18 is an exploded perspective partial view of an electrical welding generator.
Figure 19:
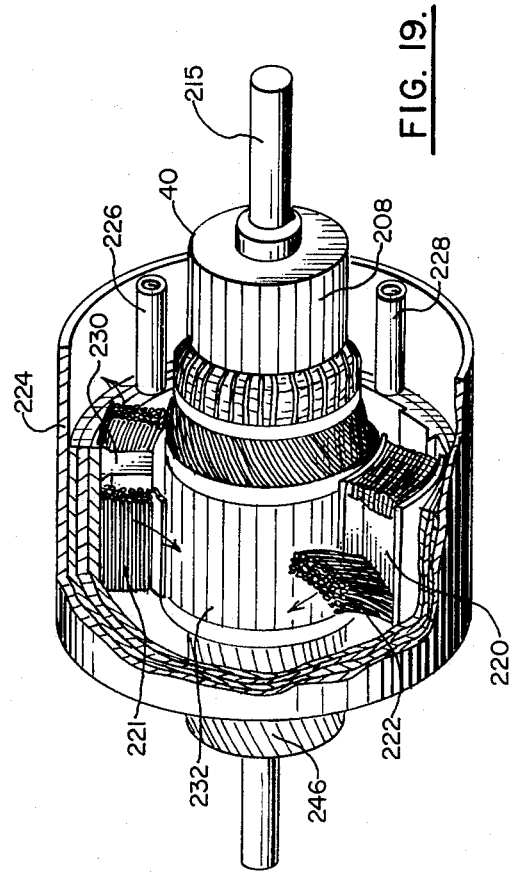
FIG. 19 is a cut-away perspective view of the generator housing, motor rotor, generator rotor and commutator shown in FIG. 18.

FIGS. 18–21 illustrate the use of the above-described first and second embodiments of this invention. FIG. 18 illustrates an electrical welding generator, generally designated by the numeral 200. The drawing depicts various parts of electrical welding generator 200 which must be removed before the apparatus of this invention may be put into use. As mentioned previously, complete tear-down of the electrical welding generator is not required. As shown in the drawing, the only parts of the electrical welding generator 200 which are to be removed are end housing 216, first mid band 214, fan 212, support frame 210 and second mid band 202. By removing these parts, it can be seen that access to the front of the electrical welding generator is made possible while hand access to the mid section of the same generator is also possible. After these parts have been removed the pole piece windings 222 and 221 are cut and removed from pole pieces 220 and 230 respectively. It should be noted at this point that pole pieces 220 and 230, while mounted in the same generator housing, are of different size and thus each use one of the prior described embodiments of this invention. FIG. 19 depicts the removal of the pole piece windings while also showing pole pieces 220 and 230 as they are mounted in generator housing 224. Extending out of generator housing and in a path parallel to generator axle 215 are bolt mounts 228 and 226. Mounted on generator axle 215 is commentator 208, generator rotor 232 and motor rotor 246.

Figure 20:
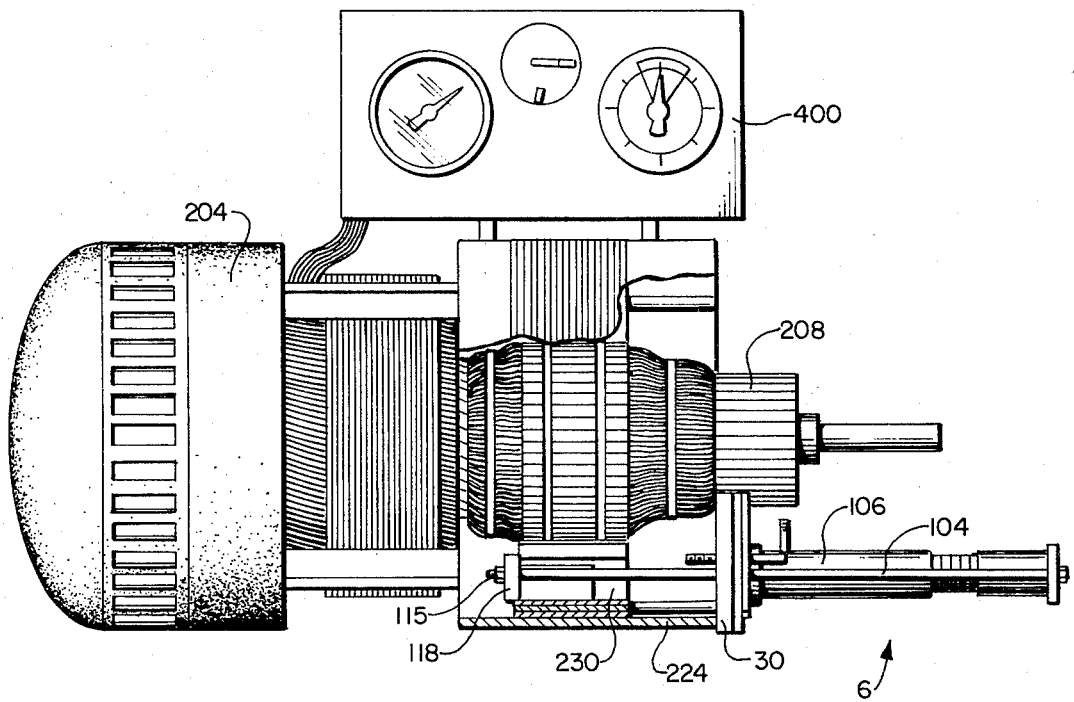
FIG. 20 is a cut-away side elevational view of the apparatus shown in FIG. 4 as it is used on an electrical welding generator.

After pole windings 221 and 222 have been removed from pole pieces 220 and 230 respectively, the apparatus of this invention is positioned into place. As can be seen in FIG. 20, the embodiment of this invention depicted in FIG. 4 is positioned so as to receive the small pole piece 230. Positioning is achieved by first bolting plate 30 to generator housing 224. Second holding plate 114 is aligned with plate 30 so that apertures 27 and 27a are in alignment with apertures 25 and 25a respectively of plate 30. Rods 104 and 104a are then inserted through apertures 27 and 27a and through apertures 25 and 25a of plate 30 so that they extend past pole piece 230. Then second contacting plate 118 is bolted into place and in contact with pole piece 230 by means of second contacting nuts 115 and 115a. Second connecting plate 100 is bolted to rods 104 and 104a by second connecting nuts 102 and 102a. Second pneumatic or hydraulic cylinder 106 is placed in position in second holding collar 110 and abutting second connecting plate 100. Force is then applied to second contacting plate 118 by forcing second connecting plate 100 away from plate 30 by means of second hydraulic or pneumatic cylinder 106.

Figure 21:
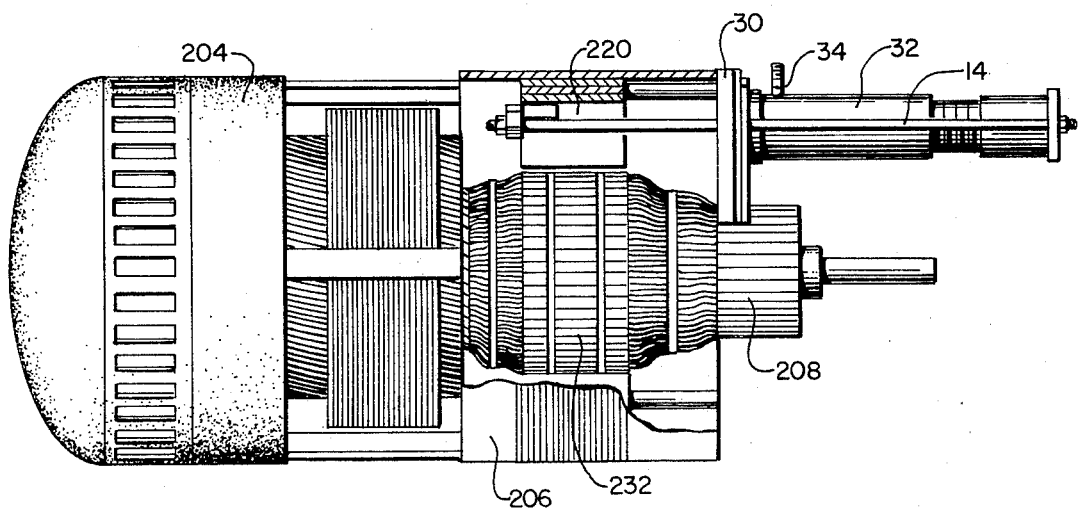
FIG. 21 is a cut-away side elevational view of the apparatus of FIG. 1 as it is used on an electrical welding generator.

FIG. 21 depicts the first embodiment of this invention in position and in use for pulling pole piece 220, which is a pole piece larger than pole piece 230, previously described. When pulling large pole piece 220 the identical same procedure is utilized as when pulling smaller pole piece 230, the only difference being that the apparatus used is different from the apparatus used for pulling small pole piece 230.

I claim:

1. An apparatus for pulling a tight fitting pole piece from a generator housing comprising:

a. a first plate having at least two first plate apertures therethrough, said plate being a semicircular plate and including a semicircular indentation on the straight edge of said semicircular plate for accommodating the commutator of said generator, said semicircular indentation being concentric with the curved edge of said semicircular plate;

b. contact means for contacting said pole piece;

c. at least two substantially parallel elongated force transmittance means attached at one of their ends to said contact means and passing through said apertures;

d. connecting means connecting said force transmittance means at their other ends; and e. force means contacting said plate on that side of said plate opposite said contact means and contacting said connecting means whereby an outward force applied by said force means causes said connecting means to move away from said plate and said contact means to move towards said plate.

2. The apparatus of claim 1 wherein said force means is a pneumatic or hydraulic cylinder, said plate has at least one mounting aperture therethrough for mounting said plate to said housing and said contacting means additionally has guiding means for aiding in the guidance of said pole piece as it is removed from said housing.

3. The apparatus of claim 1 wherein said force means is a pneumatic or hydraulic cylinder.

4. The apparatus of claim 1 wherein said plate has at least one mounting aperture therethrough for mounting said plate to said housing.

5. The apparatus of claim 1 wherein said plate has at least three mounting apertures therethrough for mounting said plate to said housing.

6. The apparatus of claim 1 wherein said first plate apertures comprise at least two pairs of spaced-apart apertures, said pairs being positioned such that a second pair is bounded by a first pair, and said first pair of spaced-apart apertures being each located equidistant from the center of said semicircular plate and said second pair of spaced-apart apertures being each located equidistant from the center of said semicircular plate, said second pair being located at a distance greater than the distance of said first pair from the center of said semicircular plate.

7. The apparatus of claim 6 which additionally includes a second plate which overlies said first plate, said second plate having on one side an outwardly extending collar bounded between two second plate apertures, said second plate apertures overlying said second pair of first plate apertures and having on the other side of said second plate a pair of second pegs which are receivable into said first pair of first plate apertures.

8. The apparatus of claim 6 which additionally includes a third plate which overlies said first plate, said third plate having on one side an outwardly extending collar bounded between a pair of third plate apertures, said third plate apertures overlying said first pair of first plate apertures, and a third third-plate aperture which overlies one of said mounting apertures and having on the other side a pair of third pegs which are receivable into said second pair of first plate apertures.

9. The apparatus of claim 1 wherein said contact means additionally has guiding means for aiding in the guidance of said pole piece as it is removed from said housing.

* * * * *